June 8, 1948. W. MENRATH 2,442,821
DRAFT ELIMINATOR FOR VEHICLES
Filed Jan. 5, 1946 3 Sheets-Sheet 1
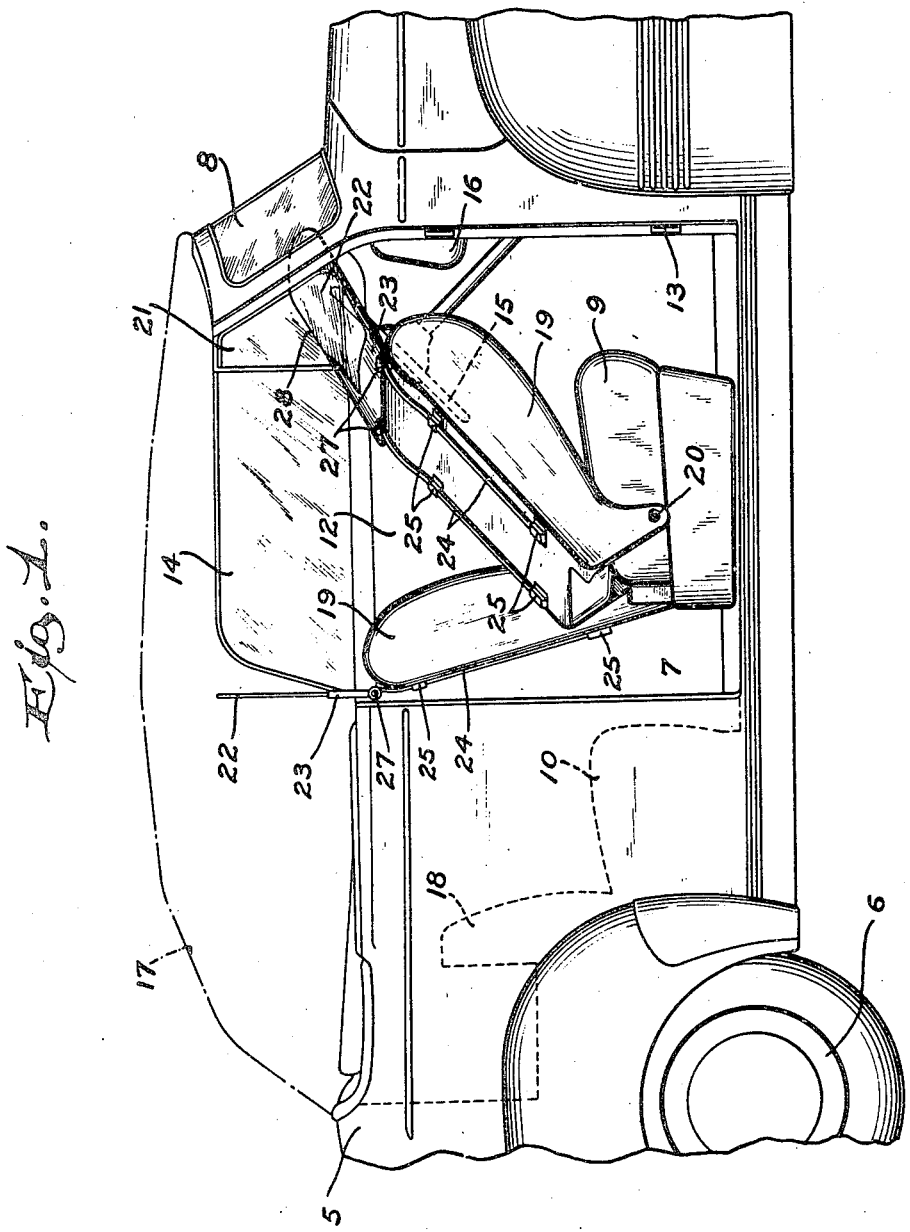
INVENTOR.
Walter Menrath
BY
Lieber & Lieber
ATTORNEYS.

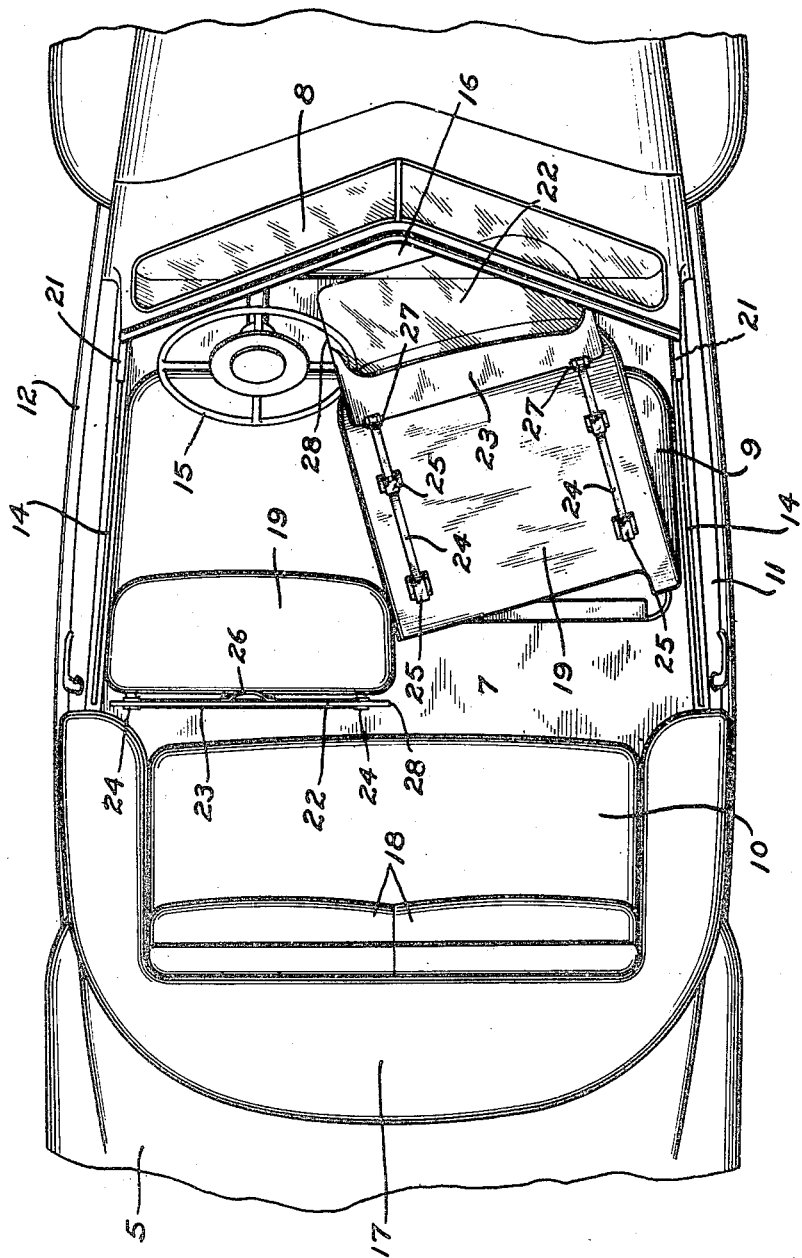

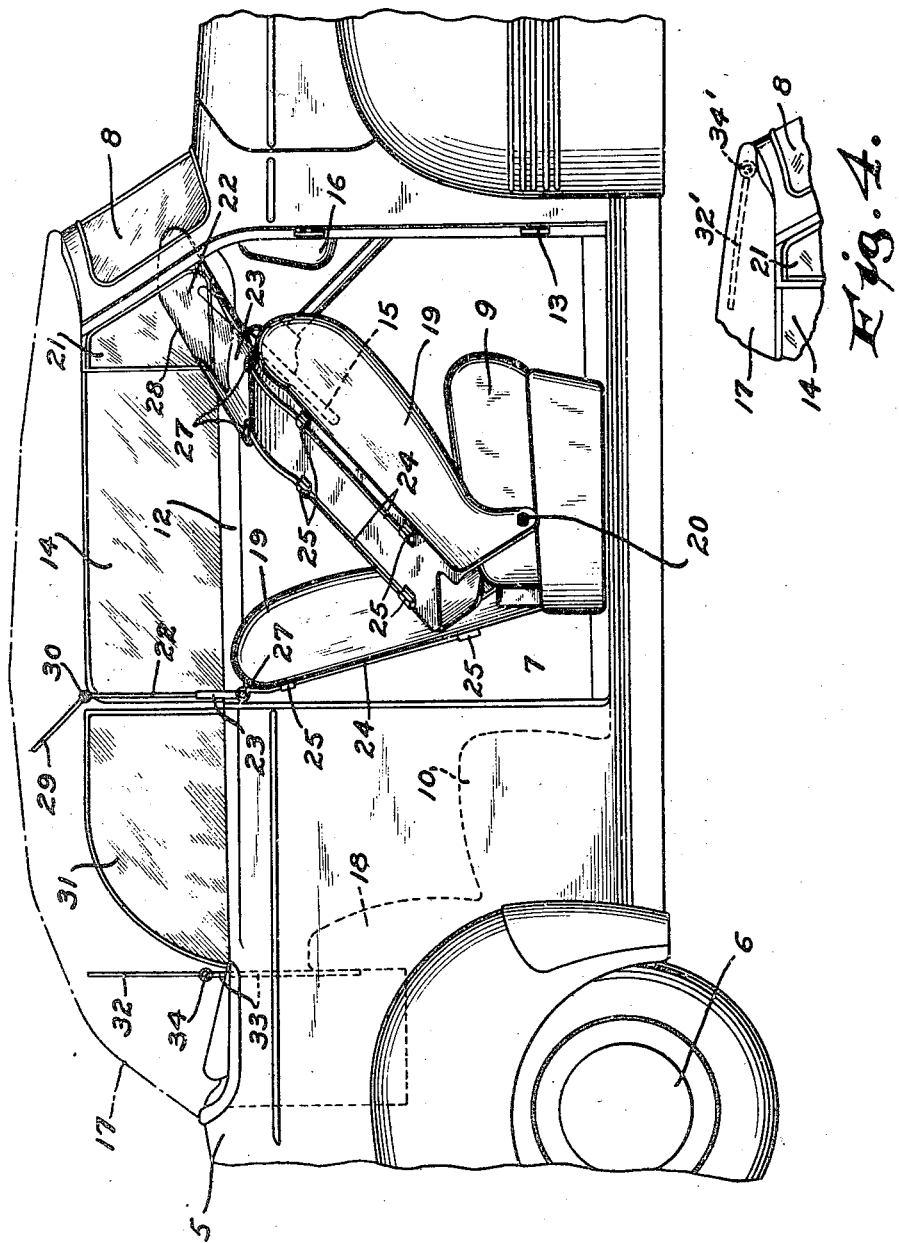

Patented June 8, 1948

2,442,821

UNITED STATES PATENT OFFICE 2,442,821

DRAFT ELIMINATOR FOR VEHICLES

Walter Menrath, Milwaukee, Wis.

Application January 5, 1946, Serial No. 639,189

5 Claims. (Cl. 296—85)

The present invention relates in general to devices for enhancing the comfort of occupants of fast moving vehicles, and relates more specifically to improvements in the construction and operation of draft eliminators which are especially applicable to open-top automobiles or the like.

The primary object of my invention is to provide an improved draft eliminating assemblage for open-top vehicles or the like, which is simple in construction and highly effective in use.

One of the principal objections to the use of so-called convertible cars wherein the normal top may be readily removed in order to convert the vehicle from a closed to an open type and vice versa, is the fact that the occupants of the open automobile are frequently subjected to severe drafts especially when travelling at high speed. While the front windshield of these convertible cars is usually rigidly associated with the body, and side shields are provided on the opposite side doors in close proximity to the windshield, thus substantially obviating front and side drafts, no proper provision has heretofore been made for the elimination of rear drafts which have always been found exceedingly annoying in these open-top vehicles especially when in rapid motion. Although some early attempts were made to provide shields of various types at the rear of the seats of automobiles, some of which were presumably for the purpose of checking undesirable rear drafts, these prior structures failed to accomplish this purpose because they did not make suitable provision for varying the gap or space between the tops of the fixed windshield and of the draft eliminators. I have discovered that in order to effectively eliminate such objectionable rear draft in both the front and rear seats of a fast moving vehicle, it is necessary to provide means for conveniently adjusting or varying the length of the opening at the tops of the front and rear shields of each seat enclosure measured in the direction of movement of the car; and I have also found by actual test, that without such gap predetermination or adjusting means it is impossible to efficiently obviate annoying back drafts.

It is therefore a more specific object of the present invention to provide an improved rear draft eliminator for open cars, which may be properly initially constructed for new cars and conveniently adjusted when applied to existing cars so as to meet various conditions arising from the construction and operation of diverse types of vehicles, and which will vastly improve the riding comfort of open automobiles or the like.

Another specific object of this invention is to provide a simple draft eliminating shield which is especially applicable to the front or driver's seat, and which may be readily applied to new automobiles or as an accessory to most existing vehicles, without undesirably interfering with the normal operation and use of such cars.

A further specific object of the invention is to provide an improved rear draft eliminating assemblage for convertible coupés which is sturdy and durable in structure, effective in use, and which enhances rather than marring the appearance of the vehicle with which it is associated.

Still another specific object of my present invention is to provide a new and useful rear draft eliminator which is especially applicable to divided automobile seats wherein the seat divisions are independently forwardly swingable in order to permit access to the space in back of the seat.

An additional specific object of my invention is to provide a simple but efficient draft eliminating accessory for open-top cars or the like, which is conveniently and advantageously applicable to high speed streamlined vehicles having fixed rearwardly and upwardly inclined front windshields.

Another specific object of this invention is to provide an improved rear draft eliminating assembly which may be effectively applied to both the front and rear seats of a plural seat vehicle of the convertible type, without obstructing or undesirably interfering with the mechanism for raising and lowering the top.

These and other specific objects and advantages of the invention will be apparent from the following detailed description.

A clear conception of the features constituting the present improvement, and of the construction and mode of operating rear draft eliminators embodying the invention, may be had by referring to the drawings accompanying and forming a part of this specification wherein like reference characters designate the same or similar parts in the various views.

Fig. 1 is a fragmentary side view of a typical two-door convertible coupé having one side door omitted and one of the divisions of the back of the front seat tilted forwardly, and also showing the improved rear draft eliminators applied to both of the front seat back sections, the outline of the top being shown in dot-and-dash lines;

Fig. 2 is a fragmentary top view of the same convertible coupé with the top removed and likewise having one back section of the front seat tilted forwardly and showing the improved rear draft eliminators applied to both front seat back divisions;

Fig. 3 is a fragmentary side view of the convertible coupé similar to that of Fig. 1, but showing the improved rear draft eliminators also applied to the rear seat of the vehicle; and Fig. 4 is a fragmentary view showing a modified mounting for the rear draft eliminating shield.

While the invention has been shown and described herein as being advantageously applicable to the seats of a two-seater typical convertible coupé, it is not my desire or intent to unnecessarily restrict the utility of the improved rear draft eliminators, by virtue of this limited disclosure.

Referring especially to Figs. 1 and 2 of the drawing, the typical two-door two-seated convertible coupé shown therein, comprises in general, a streamlined body 5 supported upon wheels 6 and having a driver's and passenger's compartment 7 provided with a fixed rearwardly and upwardly inclined front windshield 8, and with front and rear seats 9, 10 respectively; two opposite side doors 11, 12 swingably connected to the body 5 by means of front hinges 13, each door having a vertically adjustable side shield 14 associated therewith and cooperable with the adjacent end of the windshield 8 to provide a continuous U-shaped shield extending about the front and sides of the driver's seat 9; a steering wheel 15 and an instrument panel 16 disposed within the compartment 7 forwardly of the front seat 9; and a removable upper enclosure or top 17 adapted to be interchangeably positioned either above the seating compartment 7 as shown in dot-and-dash lines in Fig. 1, or folded rearwardly of the rear seat 10 as in Fig. 2.

The rear seat 10 is provided with a normally stationary back 18, but in order to provide sufficient clearance to enable passengers to conveniently enter and leave the rear portion of the compartment 7, the front seat 9 is provided with a pair of backs or back sections 19 which are swingably associated with the seat 9 by means of pivots 20. Each of the vertically adjustable side shields 14 may be provided with a ventilating wing 21 as shown, and the top 17 may be adapted for either manual or motor-operated manipulation; and is adapted to snugly engage the rear and upper edges of the elevated side shields 14 and the top of the fixed front windshield 8, when the compartment 7 is enclosed. However, when the top 17 is lowered or collapsed, the upper portion of the compartment 7 is entirely open to the ambient atmosphere, and all of the parts of the typical convertible coupé thus far described are of old and well known construction.

In accordance with one embodiment of my present invention, I provide an adjustable and removable transparent draft shield 22 at the rear upper portion of each division or section 19 of the front seat 9, and cause these rear draft shields 22 to cooperate with the fixed front windshield 8 and with the elevated opposite side shields 14 in a manner whereby annoying back drafts within the front portion of the compartment 7 are entirely and effectively eliminated. These shields 22 are preferably formed of any durable transparent material, and each shield 22 has its lower portion firmly mounted in a strong bracket 23 which is swingably adjustably supported at the upper ends of two or more bars 24 coacting with socket straps 25 firmly secured to the rear of the adjacent back section 19. The upper edge of each draft eliminating shield 22 may also be provided with an adjusting handle 26 as shown in Fig. 2, but these handles are not essential, and the brackets 23 may be attached to the upper extremities of the supporting bars 24 by means of friction hinges 27 or any other suitable pivot assemblage which will permit the shields 22 to be readily swingably adjusted while maintaining them in various positions of adjustment. The bars 24 should coact snugly with the straps 25, but should preferably be readily upwardly removable from within these straps; and the outer upper corner of the two shields 22 may be rounded as shown so as to permit clearance for lowering the top 17 without disturbing or interfering with the shields or their effectiveness; while the inner straight edges 28 thereof should be disposed closely adjacent to each other when in active position. While the hinges 27 have been shown as applied to the seats 19 by means of straps 24, they may of course be otherwise permanently or detachably applied to these seats or to adjacent structure.

During normal application and use of the improved rear draft eliminators just described, the socket straps 25 should be firmly attached to the back sections 19 of the front seat 9, in any suitable manner whereupon the supporting bars 24 may be slipped into the sockets provided by these straps 25 so as to position the hinges 27 of both shields 22 in horizontal alinement with each other. Both shields 22 should thereafter be adjusted about their pivot hinges 27 so as to cause them to lie in a transverse plane; and when the vehicle is being operated with the top 17 lowered or removed, the occupant of the front seat 19 may readily adjust or position the draft shields 22 so as to reduce or enlarge the length of the upper opening or gap between the tops of the shields 22 and the top of the fixed front windshield 8, in order to eliminate annoying back drafts. I have found that such adjustment may be readily and conveniently effected, and that when the draft eliminating shields 22 have been properly set or adjusted to suit the particular car to which they are applied, the vehicle may be operated at variable and high speeds without introducing or permitting annoying back draft to reach the occupants of the seat 19. When properly adjusted, the two shields 22 are ordinarily disposed in a common plane which is inclined forwardly and upwardly so as to cause the outer edges of the draft shields to lie closely adjacent to the rear inclined edges of the side shields 14; and the friction hinges 27 will permit the back sections 19 of the seat 9 to be swung forwardly as shown, without danger of damaging the draft shields 22 due to impact with the steering wheel 15 or instrument panel 16.

While the rear draft eliminator 22 is especially desirable for the purpose of preventing back draft at the front or driver's seat 9, such an eliminator may also be advantageously applied to the rear seat 10 of a two-seated vehicle, as shown in detail in Fig. 3. When the invention is so applied, the back draft eliminating shields 22 for the front seat 9 may be constructed, applicable, and manipulable precisely as hereinbefore described, except that the uppermost free edge of one or both of these shields 22 may be provided with an auxiliary swingably adjustable shield 29 secured thereto by a friction hinge 30. The opposite sides of the vehicle body 5 adjacent to the rear seat 10 should be provided with vertically adjustable side shields 31 which when elevated, are disposed closely adjacent to and in the vertical planes of the adjacent front side shields 14, and the back 18 of the rear seat 10 should moreover be provided with a swingably adjustable rear draft preventing shield 32 preferably pivotally associated with supports 33 secured to the seat back 18, by means of friction hinges 34. This shield 32 is preferably somewhat narrower than the space between the rear side shields 31, and has its upper corners rounded.

While the rear shield 32 is shown in Fig. 3 as being applied to the back 18 of the rear seat 10, it may also be mounted directly upon the removable top 17 as illustrated in Fig. 4. In this embodiment, the draft shield 32' is swingably suspended from the rigid frame of the top 17 by means of pivots 34' in such manner that when the top 17 is lowered, the shield 32' may be swung into proper position to serve as an effective draft eliminator.

With these modified assemblages of elements, the draft shields 22 for the front seat 9 may be applied and adjusted as previously described, in order to eliminate back draft at the forward portion of the compartment 7, and after these shields 22 have been properly set or adjusted, the auxiliary shields 29 if used, should be inclined rearwardly and upwardly substantially parallel to the front windshield 8. The rear side shields 31 should be elevated and disposed in approximate alinement with the adjacent front side shields 14, whereupon the rear draft eliminating shield 32 may be adjusted about its pivot hinges 34 so as to properly adjust the length of the opening between the upper edges of the shields 29, 32 in order to most effectively eliminate or prevent rear or back drafts from reaching the seat 10. As in the case of the front seat rear draft eliminator, this adjustment of the rear eliminator shields 22, 29, 32 may be readily effected while the vehicle is in operation, and the rearmost shield 32 would normally assume a final position of adjustment approximately parallel to the shields 22.

From the foregoing detailed description of my improved rear draft eliminators, it should be apparent that I have provided simple, compact, and highly efficient instrumentalities applicable as accessories to most modern streamlined automobiles, for eliminating annoying back drafts at the seats of the vehicle when the top is open. The shields 8, 14, 21, 22, 29, 31 and 32 are all preferably formed of durable transparent material and of neat construction, so as to enhance rather than mar the aesthetic appearance of the vehicles to which they are applied, and the predetermination or adjustment of the lengths of the upper openings or of the gaps between the upper edges of the successive shields 8, 22, 29, 32, is an important feature of the present invention. I have found by actual experience, that without proper provision for such initial predetermination and spacing or subsequent adjustment of the opening or gap, it is impossible to effectively prevent annoying back draft, and I have also discovered that as the front gap or spacing is increased, the rear span or spacing must be decreased; and the adjustable mounting of the shields 22, 32 permits ready variation of these gap lengths. The application of these shields to the rearmost surfaces of the relatively thick backs of the seat sections also eliminates interference with headwear of the front seat occupants, while still permitting a considerable range of adjustment.

The present improved back draft eliminators may either be applied as accessories to existing cars, or as built-in jobs in new automobiles, and in either case the cost of construction and installation is moderate. The shields 22, 29, 32 may be conveniently adjusted while the vehicle is in operation, and when properly set or adjusted, they function effectively both at high or low speeds; and these shields may also be swung flat against the seat backs or within the top 17 when not in use. The adjusting hinges 27, 33 may be of varied construction and provided either with or without pivot pins in a manner well known to those skilled in the art, and the same is true of the supports for mounting the adjustable shields upon the seat backs 18, 19 or adjoining structure. The shields 22 may also be applied to swingable back sections 19 without interfering with the tilting of the seats, and furthermore do not interfere with raising and lowering of the top 17 during conversion of the vehicle from one type into the other. While the improvement is primarily applicable to the front or driver's seat 9, it may also be advantageously applied to rear seats 10, and the invention has been placed into successful operation with astonishing results. With the present improvement, it is possible to properly position the draft eliminating shields so as to function most efficiently, regardless of the angular disposition of the seat backs on various types of automobiles; and the improved shields 22, 32 may be hingedly associated with the seats either directly or indirectly so as to permit ready compensation for any angularity of the seats.

It should be understood that it is not desired to limit this invention to the exact details of construction or to the precise mode of operation, herein shown and described, for various modifications within the scope of the appended claims, may occur to persons skilled in the art.

I claim:

1. A back-draft eliminating assemblage for vehicles, comprising, an open topped vehicle having a fixed upwardly and rearwardly inclined front windshield and a seat disposed rearwardly of said windshield and provided with a back terminating considerably below the windshield top, and a rigid back-draft eliminating shield for occupants of said seat rising from the top of said seat back and being swingably mounted upon the seat for adjustment of the upper edge of the shield forwardly from a position in a vertical plane with respect to said shield mounting toward the fixed windshield top edge so as to vary the length of the opening above said seat.

2. A back-draft eliminating assemblage for vehicles, comprising, an open topped vehicle having a fixed upwardly and rearwardly inclined front windshield and a seat disposed rearwardly of said windshield and provided with a back composed of independent laterally adjacent forwardly and rearwardly swingable sections terminating considerably below the windshield top, and a rigid back-draft eliminating shield for occupants of said seat rising from the top of each back section and being swingably mounted upon the seat for adjustment of the upper edge of each shield forwardly from a position in a vertical plane with respect to said shield mounting toward the fixed windshield top edge so as to vary the length of the opening above said seat.

3. A back-draft eliminating assemblage for vehicles, comprising, an open topped vehicle having a fixed upwardly and rearwardly inclined front windshield and a seat disposed rearwardly of said windshield and provided with a back terminating considerably below the windshield top, and a rigid back-draft eliminating shield for occupants of said seat rising from the top of said seat back and being pivotally mounted upon the seat for adjustment of the upper edge of the shield fordwardly from a position in a vertical plane with respect to its mounting pivot so as to vary the length of the open gap between said shield edge and the top edge of the windshield.

4. A back-draft eliminating assemblage for vehicles, comprising, an open top vehicle having a fixed upwardly and rearwardly inclined front windshield and a seat disposed rearwardly of said windshield and provided with a back terminating considerably below the windshield top, a rigid back-draft eliminating shield for occupants of said seat rising from the top of the seat back, and a pivotal mounting for said draft eliminating shield formed to effect adjustment of the upper edge of the shield forwardly from a position in a vertical plane relative to the mounting pivot so as to vary the opening above said seat.

5. A back-draft eliminating assemblage for vehicles, comprising, an open topped vehicle having a fixed upwardly and rearwardly inclined front windshield and a seat disposed rearwardly of said windshield and provided with a back terminating considerably below the windshield top, and a back-draft eliminating shield for occupants of said seat rising from the top of said seat back and being pivotally mounted for adjustment of the upper edge of the shield forwardly from a vertical position relative to its mounting pivot and toward the top edge of the fixed windshield to effect variation in the length of the opening above the seat, the outer upper corners of said draft eliminating shield being eliminated to a considerable extent.

WALTER MENRATH.

REFERENCES CITED

The following references are of record in the file of this patent:

UNITED STATES PATENTS

| Number | Name | Date |
| --- | --- | --- |
| 1,369,741 | Gingle | Feb. 22, 1921 |
| 1,412,474 | Lillie | Apr. 11, 1922 |
| 1,883,721 | Grimm | Oct. 18, 1932 |